March 28, 1933.   W. M. BAILEY   1,902,942
CAPACITOR
Filed June 8, 1929

Inventor:
William M. Bailey
By his Attorney

Patented Mar. 28, 1933

1,902,942

UNITED STATES PATENT OFFICE

WILLIAM M. BAILEY, OF LYNN, MASSACHUSETTS, ASSIGNOR, BY MESNE ASSIGNMENTS, TO GENERAL ELECTRIC COMPANY, A CORPORATION OF NEW YORK

CAPACITOR

Application filed June 8, 1929. Serial No. 369,293.

This invention relates to improvements in capacitors, and more particularly to capacitors of the sheet stack type which are adapted for use out of doors in a variety of radio and electrical installations.

Heretofore, installations comprising capacitors which were to be exposed to the elements, have been formed of a condenser stack compressed between insulating supporting members, the terminals of the condenser being connected to the ends of the structure by suitable leads, and the compression of the stack members assured by providing interposed clamping means between the supporting members.

Such installations are subject to the disadvantage that the clamping supports of insulating material are not evenly placed with respect to the stack members, thereby permitting undesirable changes in capacity, and in addition, they require filling or treatment with suitable insulating compounds in order to make them weather and moisture proof.

It is an object of the present invention to provide a capacitor of the type designated, in which the several elements are easily assembled with a minimum expenditure of time and labor.

It is a further object of this invention to provide such a device in which the operative parts are assembled on one side of a preformed supporting plate and secured in operative relation thereto.

Yet another object of this invention is the provision of an improved compression means as a part of the clamped stack structure, which compression means is adapted to automatically insure an even pressure over the active area of the stack under varying conditions of temperature and consequent stack thickness.

With these and other desirable objects and advantages in view, which may be incident to said improvements, the invention consists in the parts and combinations to be hereinafter set forth and claimed, with the understanding that the several necessary elements comprising the invention, may be varied in construction, proportions and arrangement, without departing from the spirit and scope of the appended claims.

To make the invention more easily understood, there has been shown in the accompanying drawing a preferred embodiment. In these the same numerals refer to similar parts through the several views, in which Fig. 1 is a perspective view of an improved short wave sleet melting condenser;

Figure 1:
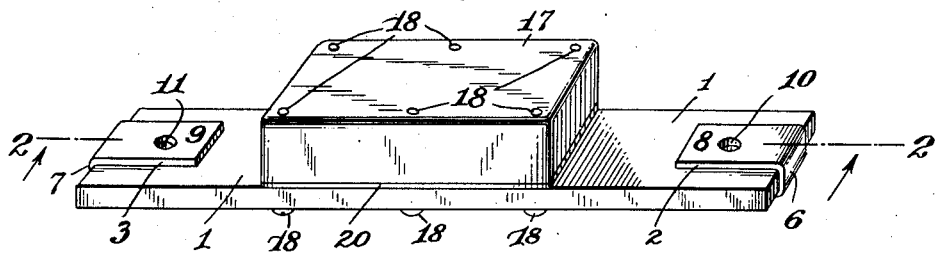
Figure 2:
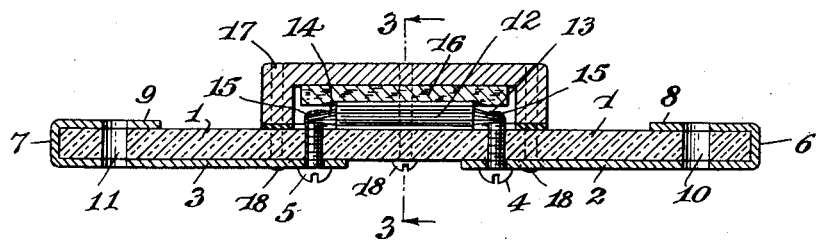
Fig. 2 is a longitudinal cross section taken on line 2—2 of Fig. 1.
Figure 3:
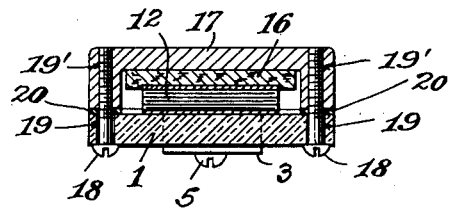
Fig. 3 is a cross-section taken on line 3—3 of Fig. 2.

The preferred construction illustrated in the accompanying drawing comprises a supporting or bed-plate or strip 1, of a phenol condensation product or any insulating material having the requisite physical and dielectric characteristics. A suitable material for this purpose is known in the trade as bakelite dilecto. This supporting member is provided with copper strips 2, 3, secured thereto by any suitable means, such as screws 4, 5, which pass completely through the plate 1. These screws subserve other functions, which will be adverted to more in detail.

The copper strips are severally bent or conformed around the ends of the supporting member as shown at 6, 7, and overlie the top of the member, being bent inwardly as shown at 8 and 9. Holes 10, 11, are drilled through the ends of the combined structure to serve for connection and mounting. While the terminal strips 2, 3, have been designated as being made of copper, any other suitable material having high electrical and heat conductivity may be used without departing from the spirit or scope of the present invention.

The supporting plate with its associated terminal members is now provided on its upper surface with a condenser stack of mica and foils, the foils protruding on either side of the stack and being bunched together into foil tabs 13, 14, of opposite polarity. These foil tabs are electrically connected to terminal screws 4, 5, above referred to, by any suitable means, such as solder 15.

There is thus provided a conducting path from the condenser structure to the terminal members which in addition to acting as such, serves to conduct heat from the interior of the stack to the relatively wide heat-dissipating copper terminal strips for the purposes set forth.

The condenser stack is provided on its upper surface with an insulating member 16 which acts as a compression member to impart an even pressure over the entire surface of the stack, thereby assuring an optimum cooperation between the foils and dielectrics in their assembled relation. As a preferred material for this purpose, cork is used. This material is available in strips of any desired width and thickness, and its natural resiliency peculiarly adapts it for use in a device of the character described.

With a stack of the desired capacity completed and in electrical and heat conducting relation to the terminal members, there remains the step of securing it in its operative compressed relation to the support. For the purpose a casing 17 is superposed on the compression member 16, and secured to the support by a plurality of screws 18, passing thru clearance holes 19 in the bed-plate 1 and engaging tapped holes 19′, in the casing. The cover preferably comprises an aluminum casting of suitable thickness for the purpose desired, whereby sufficient compression may be imparted to the stack elements for the purposes above designated.

While the casing has been described as being an aluminum casting, it is obvious that any suitable material having the requisite characteristics may be employed without departing from the spirit and scope of the invention. The casing structure affords a further increased heat dissipating area, which in conjunction with the exposed area of the terminal strips provides a maximum surface for that purpose in a device of the kind described, assuring a rapid and economical heat withdrawal from the interior of the condenser structure with a maximum of available heat dissipating surface to subserve the desired functions previously noted.

To prevent the ingress of moisture and dirt, and other deleterious matter into the interior of the casing, a yieldable gasket 20 such as those made of processed leather scraps and the like known to the trade as vellumoid is interposed between the casing and the support and held in its cooperative relationship by the clamping screws 18.

In practice, the requisite number of holes in the support are drilled before assembly of the parts of the device, thereby assuring the proper alignment of the various members and facilitating their assembly in a highly efficient and economical manner.

I particularly point out and distinctly claim the part, improvement or combination which I claim as my discovery or invention, as follows:

1. A capacitor of the character described, including, in combination, an elongated insulating supporting plate, a condenser stack positioned on the plate, foil tabs of opposite polarity extending from opposite sides of the stack; terminal screws passing through the plate and in good electrical and thermal connection with the foil tabs; a resilient compression member overlying the stack, and a casing adapted to compress the stack members, being compressed thereagainst by the engagement therewith of a plurality of casing clamping screws passing through the supporting plate and out of contact with the terminal screws; and terminal strips connected to the terminal screws and extending outwardly therefrom around the ends of the supporting plate to form terminals of high heat dissipating capacity.

2. In a device of the character described, a supporting plate, a condenser stack on the plate, resilient compression means urged against the stack by a casing thereover, the casing being held in operative engagement with the stack by clamping screws passing through the supporting plate; and terminal connections from the stack passing through the plate and around its ends, as and for the purposes described.

3. In a device of the character described, a supporting plate, a condenser stack on the plate, non-metallic resilient compression means urged against the stack by a casing thereover, the casing being held in operative engagement with the stack by clamping screws passing thru the supporting plate; and terminal connections from the stack passing through the plate and around its ends, as and for the purpose described.

4. A capacitor of the sheet stack type, comprising a supporting member, a stack of alternate dielectrics and foils, a non-metallic resilient compression member on the stack, a casing overlying the stack and compression member and secured to the supporting member to compress the stack and compression member; and terminals extending from the stack through the support to the ends of the latter.

5. A capacitor which includes a stack and a casing therefor, the casing including an insulating supporting plate, a gasket thereon, and a metallic dish-shaped member having a flat inside bottom and of which the concavity faces the insulating plate and the rim engages the gasket; said casing forming a housing enclosing the stack and its projecting armatures of different polarity; terminal screws extending thru said insulating supporting plate into the interior of the housing and connected to said projecting stack armatures; a flat pressure plate of material more resilient than said gasket and lying between the stack and the flat inside bottom of said dish; and clamping screws extending thru the insulating plate, the gasket and the rim of the dish and pressing the dish, gasket, pressure plate and stack toward the plate; said pressure plate holding the stack under compression when the dish holds the less resilient gasket in moisture-sealing engagement with the insulating supporting plate, and said pressure plate of material of greater resiliency than the gasket having a resilient range maintaining the desired compression on both the stack and the gasket at various temperatures and consequent stack-thicknesses without releasing the clamping seal on the gasket.

6. A capacitor which includes a stack, a two-part housing of which one part is of metal and the other of insulating material, a moisture-sealing gasket between the two parts of the casing, one face of the stack bearing against the insulating part of the casing; a pressure plate of resilient insulating material lying between the stack and the metallic part of the casing insulating the latter from the former; and clamping means compressing between the two parts of the casing, the gasket, the stack and the resilient insulating pressure plate; said insulating plate consisting of a material more resilient than the gasket and maintaining both a clamped moisture-seal by the gasket and also desired stack-compression, at various stack-thicknesses due to different stack-temperatures.

7. A capacitor which includes a stack and a resilient pressure plate therefor, a two-part casing housing the stack and pressure plate, a gasket between the two parts of the casing, and clamping means compressing between the two parts of the casing, the gasket, the stack and the resilient pressure plate, the pressure plate consisting of a material more resilient than the gasket and maintaining both a clamped moisture-seal by the gasket and also desired stack-compression, at various stack-thicknesses due to different stack-temperatures.

8. A capacitor which includes a stack, a two-part housing of which one part is of metal and the other of insulating material; a moisture sealing gasket between said two parts of the casing; one face of the stack bearing against the insulating part of the housing; a plate of cork insulating the other face of the stack from the metallic part of the casing, said cork plate serving also as a stack-compressing plate; and means compressing between the two parts of the casing, the gasket, the stack and the stack-insulating, stack-compressing cork plate, the cork being more resilient than the gasket and maintaining both a clamped moisture-seal by the gasket and also desired stack-compression, at various stack-thicknesses due to different stack-temperatures.

9. A capacitor which includes a stack, a two-part casing therefor, a gasket between the two parts of the casing; a clamping plate of cork having greater resiliency than said gasket and interposed between the stack and one of said casing parts; and means compressing between the two casing-parts, the gasket, the stack and the cork clamping plate, the greater resiliency of the latter maintaining desired clamping pressures on the gasket and stack at different stack-thicknesses due to different stack-temperatures.

In testimony whereof I hereunto affix my signature.

WILLIAM M. BAILEY.